United States Patent [19]
Orloff

[11] 4,038,657
[45] July 26, 1977

[54] INTERMITTENT RANGE TRACKER
[75] Inventor: Leslie M. Orloff, Huntington, N.Y.
[73] Assignee: The United States of America as represented by the Secretary of the Navy, Washington, D.C.
[21] Appl. No.: 833,242
[22] Filed: June 9, 1969
[51] Int. Cl.$^2$ .............................................. G01S 9/14
[52] U.S. Cl. ..................................................... 343/7.3
[58] Field of Search ............................ 343/5 DP, 7.3
[56] References Cited
U.S. PATENT DOCUMENTS

| 3,167,738 | 1/1965 | Westerfield | 343/5 DP X |
|---|---|---|---|
| 3,456,257 | 7/1969 | Aker | 343/7.3 |

Primary Examiner—T.H. Tubbesing
Attorney, Agent, or Firm—R. Sciascia; R. Beers; S. Sheinbein

[57] ABSTRACT

There is disclosed an intermittent data tracker that is capable of providing smooth target tracking data from intermittent target range data. The heart of the intermittent tracker is an instantaneous position memory (IPM) which can instantaneously memorize the range of a target video signal, and play it back immediately, or at any later time, with no loss in accuracy. The IPM is updated in accordance with computed target velocity, and corrected as necessary by comparison of the predicted range with the measured target range derived from the tracking radar video.

7 Claims, 2 Drawing Figures

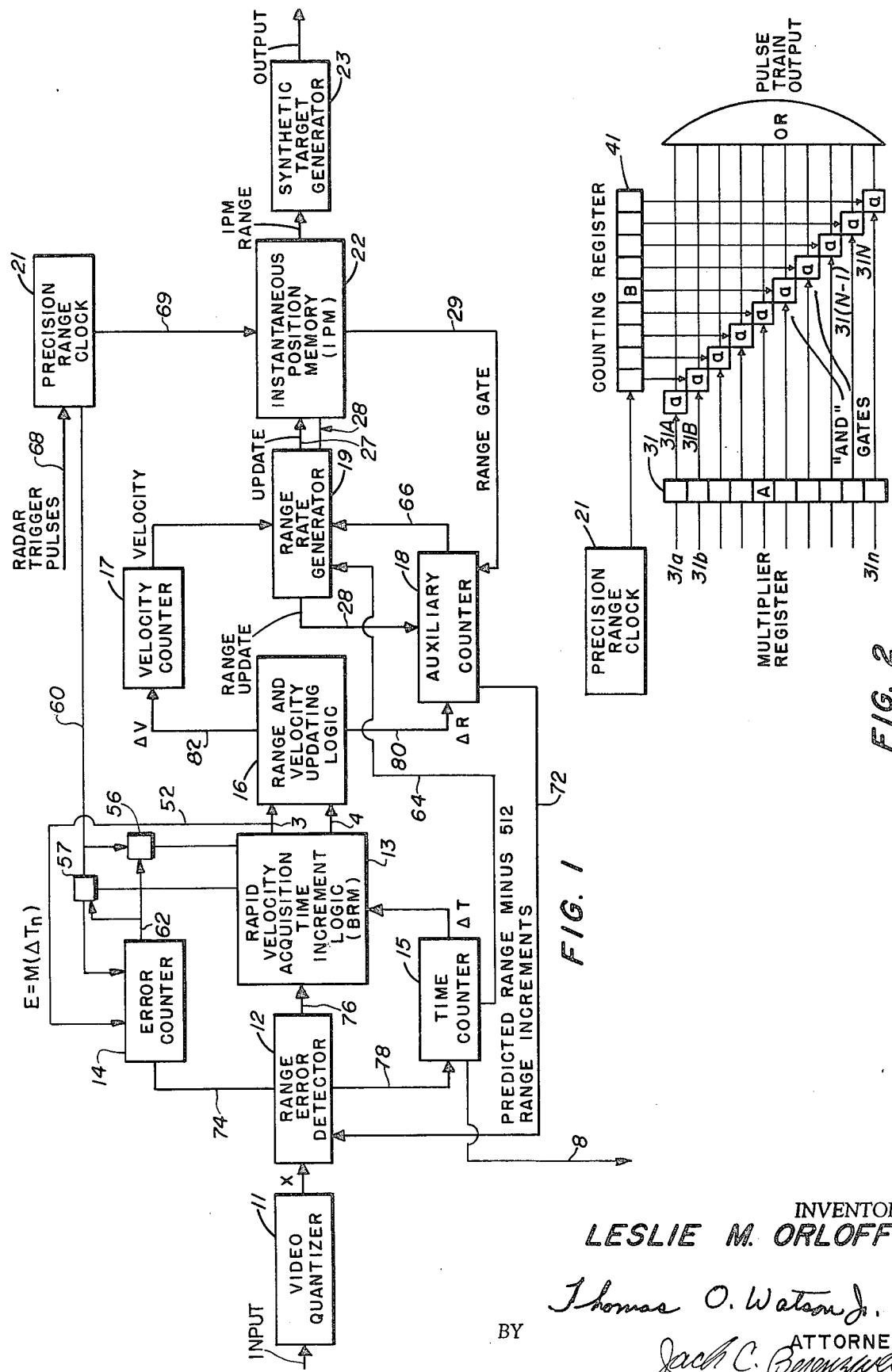

INTERMITTENT RANGE TRACKER

STATEMENT OF GOVERNMENT INTEREST

The invention defined herein may be manufactured and used by or for the Government of the United States of America for Governmental purposes without the payment of any royalties thereon or therefor.

BACKGROUND OF THE INVENTION

1. Field of the Invention

The present invention relates to data tracking and more particularly to intermittent data tracking in the presence of target jamming or other interference which blinds a tracking radar and destroys the continuity of target range tracking.

2. DESCRIPTION OF THE PRIOR ART

In the field of radar data tracking, it has been the general practice to employ passive angle tracking systems that provide good angle information during jamming. Although such devices have served the purpose, they have not proved entirely satisfactory under all conditions of service for the reason that considerable difficulty has been experienced when the target course or speed changes and this method of tracking thereby becomes relatively meaningless. Conventional radar ranging systems are designed to operate with continuous range input data and if the data becomes intermittent, the conventional servo connected with these systems becomes unstable and quickly loses the target.

SUMMARY OF THE INVENTION

The general purpose of this invention is to provide an intermittent data range tracker which embraces all the advantages of similarly employed trackers and possesses none of the afore described disadvantages. To attain this, the present invention contemplates the use of the unique instantaneous position memory (IPM), a digital unit which can instantaneously memorize the range of a target video signal, and play it back immediately, or at any later time, with no loss in accuracy. The IPM is updated in accordance with computed target velocity, and corrected as necessary by comparison of the predicted range with the measured target range derived from the tracking radar video. The tracker may be considered to operate in a sequence similar to the normal operation of tracking radar. The phases of target acquisition and prediction may be conveniently divided as follows for ease of explanation;

1. Initial target designation
2. Target range acquisition
3. Velocity acquisition
4. Continuous range prediction
5. Position and velocity correction by error detection.

While these steps are not rigorously sequential the sequence above may be helpful in identifying the corresponding description in the discussion which follows.

It is therefore an object of the present invention to provide a means of obtaining continuity of range information in the presence of jamming.

Another object is the provision of a device which will track the range of a target accurately and consistently when the input data from radar arrives intermittently at a rate which cannot be predicted.

A further object of the invention is the provision of an intermittent data tracker that is entirely digital and can provide superior coasting capability during periods when target data is not received.

Other objects and many of the attendant advantages of this invention will be readily appreciated as the same becomes better understood by reference to the following description when considered in connection with the accompanying drawings in which like reference numerals designate like parts throughout the figures thereof and wherein:

BRIEF DESCRIPTION OF THE DRAWINGS

FIG. 1 shows a block diagram of the intermittent data tracker and constitutes the preferred embodiments of the invention.

FIG. 2 is a schematic representation of the binary rate multiplier utilized in FIG. 1.

DESCRIPTION OF THE PREFERRED EMBODIMENT

Referring now to the drawings, wherein like reference characters designate like or corresponding parts, there is shown in FIG. 1, which illustrates the preferred embodiment, an intermittent data tracker. The radar data input pulse is fed to video quantizer 11, a digital circuit used to produce a standard width pulse from any length input pulse which exceeds a predetermined threshold level. The pulse output of video quantizer 11 represents the quantized video input signal to the intermittent tracker. The output of the quantizer is fed to range error detector 12, a device which measures the distance between the current predicted target range and the measured range represented by the time delay from the radar trigger to the quantized video. The output of range error detector 12 goes to error counter 14, time counter 15, and rapid velocity acquisition time increment logic block 13. Rapid velocity acquisition time increment logic block 13 is in essence a binary rate multiplier, shown in FIG. 2, that acquires the radial velocity of a target after two radar echoes. The same binary rate multiplier used for the rapid velocity logic is also used after the velocity has been acquired to perform a multiplication function which continuously updates the target path in time. Error counter 14 is a forward-backward counter used to store the radar range error measured by the range error detector 12 and read out the error either for rapid velocity acquisition or for updating the target track. Time counter 15 is a counter used to measure the time between successive radar returns in a conventional manner. The output of the binary rate multiplier 13 is then fed to the range and velocity updating logic circuitry 16. This digital logic function block accepts information from either the rapid velocity acquisition or the time increment logic and gates these inputs, multiplied by appropriate constants and with proper sign, to the velocity and auxiliary counters 17 and 18, respectively. Velocity counter 17 is a digital counter used to store the best current estimate of the target velocity and auxiliary counter 18 is a digital counter used to store the difference in range, $\Delta R$, between the best current estimate of the range and the range actually stored in the instantaneous position memory 22. Range rate generator 19 is another binary rate multiplier, similar to BRM 13, which produces pulses at a rate proportional to the number stored in velocity counter 17 and provides an auxiliary velocity determined by the sign of the auxiliary counter 18. The pulse output train produced by this binary rate multiplier is gated to update the range stored in the instantaneous position memory 22. Instantaneous position memory 22 is a highly accurate digital device for storage and readout of range information. Precision range clock 21 supplies the source of time increment used in measuring range and the source of synchronizing signals used in instantaneous position memory 22 as well as the other functional blocks previously described. The output of IMP 22 is then electrically fed to synthetic target generator 23 to produce a synthetic radar pulse representing the target. FIG. 1, while showing the general path of information flow between functional blocks does not show any of the connections between the system programming logic and other functional blocks since this logic does not directly act on the tracking information. System programming logic acts to modify the performance of other functional blocks and is in fact connected to virtually all of the blocks described and it controls mode of operation of these blocks. This logic maintains the proper sequence of events starting with range designation and then switching to range acquisition, velocity acquisition, and finally to the normal tracking mode. The logic also provides capability for rapid redesignation of the target.

Now, referring to the individual elements of FIG. 1 in more detail, target range information within the intermittent data tracker is stored and regenerated by basic IPM 22. This element can instantaneously memorize the range of a selected target from any radar, during a single look, hold it for an indefinite period, and play it back upon command as often as desired. The playback can be synchronized to a subsequent trigger of the same radar or to an entirely different radar having completely independent source of synchronization.

The IPM 22, which is composed of a typical digital counter, generates an output at the range which is stored in the counter just prior to the occurrence of a radar trigger. In addition, by the addition of appropriate gating the IPM can generate pulses at any fixed time before or after the predicted range to control the generation of the range acceptance gate. Dynamic operation of IPM 22 occurs in real time, starting with the radar trigger on line 68. Read-in and read-out of target range takes place with reference to a high frequency Master Range Clock 21. Between sweeps of the radar, however, the target range information is stored as a 15-bit "number" in the IPM counter register which can hold any range delay from 0 to 32,767 increments.

IPM 22 is controlled by precision range clock 21 which in turn is controlled by a precision oscillator, synchronized at the beginning of each sweep to the radar triggers. Following the radar trigger, the range clock delivers a precisely counted pulse train equal to the maximum range count on line 69. It is then turned off during the radar dead time until the receipt of another radar trigger pulse.

During the dead time the range is held in the IPM 22 as the complement of the counter corresponding to the target range. The IPM 22 receives the precisely counted pulse train from the Range Clock 21 beginning at the radar trigger. The stored range can be changed slowly, one range increment at a time, by adding update pulses to the IPM counter during the dead time, or it can be changed instantaneously to any other range by a pulse occurring at the desired range. At the instant the pulse arrives, the count of the IPM is reset to zero and the counting of the pulses from the Precision Range Clock 21 continues normally. The digital number stored in the IPM at the end of each sweep (and, hence, at the beginning of the following sweep) is the numerical complement of the target range. The Precision Range Clock produces no pulses during the radar dead time; hence, the number held in the IPM register remains fixed. At the beginning of the next sweep, the range clock is again started, and these pulses enter the IPM counter. When the IPM counter reaches its maximum count an overflow occurs which is the output pulse. This pulse occurs at precisely the same time delay with respect to the radar trigger as the original target pulse whose position was stored. At the end of the clock cycle the IPM again has stored the complement of the target range count. The output is then continuously regenerated in a similar fashion on successive sweeps until the stored range is changed.

The output from instantaneous position memory 22 is fed directly to the synthetic target generator 23. This device produces a smoothly varying output signal whose width is equal to the actual radar transmitter pulse. This pulse is to be used as an input signal to the analog range follow-up circuits of the tracking radar and may also be used to transfer range between radars and displays.

In the intermittent tracker, auxiliary counter 18 stores the difference in range between the range stored in the IPM and the range predicted by the tracking loop. The IPM does not store (at least at all times) the predicted range, since this predicted range is subject to rapid changes whenever new range data pulses are received. Changing the IPM in this abrupt manner would cause the tracker output to change accordingly, a condition which is not tolerable as an input to a conventional radar range or to many computers. The auxiliary counter 18 stores the difference in range when abrupt changes occur, and the contents of this counter are then fed to the IPM 22 at a constant rate, known as the auxiliary velocity. The auxiliary velocity is maintained for the time necessary to make up the stored range difference. Control of the auxiliary velocity is maintained by the range rate generator 19 which will be described later.

The auxiliary counter 18, working with an output from the IPM 22, is used to generate a pulse necessary for proper operation of the range error detector 12. This pulse must occur at a delay corresponding to 512 range increments before the predicted target position. Since the auxiliary counter stores the difference between IPM and the predicted range, its contents must be added to the IPM range to obtain the predicted range. The auxiliary counter is a typical 10-bit, forward-backward counter capable of storing −512 to +512 range increments. To obtain a pulse with the desired delay, an output gate is generated in the IPM which lasts for exactly 1024 precision range clock pulses and starts at a time corresponding to a range of −1024 range increments before the range stored in the IPM. This gate is used to feed 1024 clock pulses auxiliary on line 7 to the counter on line 29. The auxiliary counter counts backward during these pulses and generates an output pulse when a count of −512 is reached. This pulse has the desired time delay and is subsequently fed to the range error detector 12 on line 70. When the 1024 counts are complete, the auxiliary counter will have counted back to its original state; thus, the number in the auxiliary counter remains unchanged.

The pulse from the auxiliary counter 18 initiates the functioning of range error detector 12. When the pulse arrives, 512 pulses before the predicted target position, the range error detector 12 gates clock pulses to the error counter 14, another 10-bit counter on line 74. The error counter 14 is started at a count of −512 range increments; thus, it will take 512 clock pulses before it reaches zero count at exactly the time of the target prediction. A range acceptance gate 31 in BRM 13, shown in FIG. 2, is controlled by the count in the error counter on line 76; the gate may be set, for example, to open at a count of −4 and close at +4, or any count up to the total count of the error counter. If a pulse arrives from the video quantizer 11 while the range acceptance gate is open, the error counter is immediately stopped. The count in the error counter then corresponds to the error in time between the received pulse and the predicted target position. When an error is detected, range error detector 12 initiates a gate to turn off the time counter 15 on line 78. If no pulse is received, the error counter is gated off when it counts around to its original state, i.e., a count of −512.

Time counter 15 is used to measure the elapsed time since the last detected target return within the range acceptance gate. This counter, with its own internal time clock, starts at a count of zero and continues to count until it is turned off by the range error detector 12. The number stored is then proportional to the time between received pulses. This number is used by the rapid velocity acquisition time increment logic block 13, and then the counter is reset to zero to count the time until the next radar return.

The time counter is also used to produce a pulse whenever the time between samples of range data exceeds a preset time ($T_o/4$). This pulse is sent to the system programming logic on line 8 to initiate a mode switch from normal time increment logic on line 8 to rapid velocity acquisition.

Before continuing on a discussion of the other functional blocks of the intermittent tracker, it is important to understand the binary rate multiplier, shown in FIG. 2, a device that is an integral part of rapid velocity acquisition logic, the time increment logic, and the range rate generator, which compose blocks 13 and 19.

The binary rate multiplier is a remarkably versatile, though compact, digital computer element. In addition to being especially well adapted to the generation of smooth, continuously varying digital range information, BRM may also be employed effectively in the computation of target velocity and for several other related functions in the smoothing and predicting computation. Continuous multiplication or division of analog qualities may be performed by the BRM to any desired degree of precision. Integration may be performed with respect to time, or to any other quantity as the independent variable of integration. Discrete multiplications or divisions may also be performed.

The simplicity of the binary rate multiplier derives largely from an interesting, but infrequently used property of the ordinary binary counter. Although any number of stages in such a counter may switch simultaneously from "one" to "zero" during the cycling operation one and only one stage goes through a "zero" to "one" transition at each clock pulse interval, and further, these transitions occur in each of the binary stages at regular intervals. The least significant bit (LSB) of an $n$-stage counter goes through precisely $2^{n-1}$ transitions, while the counter goes through $2^n$ counts. The next least significant flip-flop goes through one-half as many transitions, or $2^{n-2}$ transitions, this progression continuing up through the most significant bit, which executes only one isolated transition in the corresponding interval. One obvious way of using the 0−1 transition property would be to differentiate and clip the flip-flop outputs.

A counter 41 producing such streams of binary pulses may, therefore, be converted to a binary rate multiplier by applying these pulse streams to one of N AND gates 31A-31N the outputs of which are summed by a single OR gate. Note that ambiguities can not occur, since the two pulses cannot occur at the same time. The second inputs to the AND gates 31A-31N are simply the "ones" and the "zeros" of the binary number which is to be multiplied by the binary pulses from counting register 41. This number is held in the vertical register 31 in FIG. 2.

The most significant bit of the multiplier is applied to the AND gate connected to the least significant bit of the binary counter. Since this stage produces one-half as many transitions as the clock source, we may consider this stage to be a multiplier which permits either (1) no pulses to be transmitted, if the gate is off, or (2) one-half the clock rate (0.5X), when the gate is on. Similarly, the next stage (if its input is a "one") passes ¼ of the input clock pulses, the third stage ⅛, etc. The last gate will pass only one pulse for each $2^{n-1}$ input pulse. The output pulse stream appears somewhat irregular, since individual pulses can only occur at clock times. Any any instant, however, the total number of output pulses accumulated at the output is equal to the theoretically correct subtotal, to the nearest count.

The time increment logic utilized in block 13 is a binary rate multiplier adjusted to compute the quantity $E' = E(\Delta T_n)$ when $\Delta T_n < T_o/4$. To accomplish this multiplication, the time counter 15, which contains the quantity $\Delta T_n$ when an error is detected, forms the fixed or multiplier register of the BRM. The counting register 41 is then used to receive a train of pulses from precision range clock 21 on line 5. These pulses are applied on line 60 through a gating device 57 to counting register 41 and to error counter 14 from line 5 to decrease the stored error. When the stored error reaches zero, the clock pulses are gated by a pulse on line 62 to gate 57. The resulting BRM output is a string of pulses equal to the desired quantity $E(\Delta T_n)$. This output is then fed to the range and velocity updating logic 16.

When a new target has been acquired, or when the time between samples of range data exceeds $T_o/4$, the rapid velocity acquisition logic of block 13 replaces the function of the time increment logic. This logic is physically the same BRM as is used in the time increment logic but the input and output are gated differently to produce a different function. There are two outputs desired during rapid velocity acquisition. These are the measured range error, $E$, and the error divided by the time, $E/\Delta T_n$.

For rapid velocity acquisition the time counter again serves as the fixed register 31 and the counting register 41 again receives a train of pulses from the precision range clock 21 from line 60 and gate 56 on line 5. In this configuration, however, the output of the BRM is gated into the error counter 14 on line 3 to decrease the stored error on line 52. When the error counter stored error reaches zero, the clock pulses are gated off by a pulse on line 62. Since the number of pulses, $N$, appearing at the output of the BRM are just sufficient to drive the error counter 14 to zero, it follows that the stored error $E = N$. If the number of input clock pulses to the counting register of the BRM is $M$, then the operation of BRM requires that $N = E = M(\Delta T_n)$ or $M = E/(\Delta T_n)$. The number of input pulses to the BRM is one of the desired outputs, while the output from the BRM is the other desired output. The input pulses to the BRM are thus shunted to bypass the counting register 41 and applied to block 16 on line 4. The BRM output is applied to block 16 on line 3. During rapid velocity acquisition, these two strings of pulses are fed to the range and velocity updating logic 16.

Block 16 receives strings of pulses from the rapid velocity acquisition/time increment logic BRM, multiplies them by the proper constants and then gates these resulting pulse trains to the velocity counter 17 and the auxiliary counter 18. As a result, these two counters are properly updated to maintain the proper prediction for the target range. When in the rapid velocity acquisition mode, the updating logic of block 16 directly gates the BRM output pulses which are equal to the error, auxiliary to the counter 18 on line 80 and gates the BRM input pulses which are equal to $E/\Delta T_n$, to the velocity counter on line 82. Control of the multiplication and gating is accomplished by the over-all programming logic. The velocity counter 17 is an ordinary 10-bit forward-backward counter capable of storing up to 512 velocity increments (9 bits) plus a sign (1 bit). The input consists of strings of pulses from the updating logic 16. The contents of this counter are used to determine the rate with which the range rate generator 19 updates the instantaneous position memory 22.

Range rate generator 19 is another binary rate multiplier as in FIG. 2. In this case, the multiplier is used to supply updated pulses to the instantaneous position memory to maintain a continuous and accurate target track prediction. The configuration is sowewhat unique, since the BRM is actually a multiplexed version of two BRM's. There are two fixed registers 31 and 31' (now shown); one, the velocity counter and the other a fixed register which contains the preset value of the auxiliary velocity. The auxiliary velocity is a fixed number (not the number in the auxiliary counter 18, which is a range error). Each fixed register is connected to its individual gating circuits, and there are two separate outputs. A single counting register 41, however, is common to both.

The input to the counting register consists of a stream of pulses from line 6 at a constant rate, actually the same clock pulses which drive the time counter 15. The output of one-half of this BRM, the half containing the velocity counter, provides updated pulses on line 1 to the instantaneous position memory at the proper rate to maintain the predicted target velocity on line 27. The sign (+ or −) of these updated pulses is controlled by the sign of the velocity counter. The other half of the BRM provides updated pulses on the two lines 2 at a rate equal to the auxiliary velocity. The pulses perform two functions; first, to update the IPM on line 28 and second, to decrease the number stored in the auxiliary counter 18 on line 28. The sign of this output is determined by the sign of the auxiliary counter 18. When the auxiliary counter is reduced to zero, the number of pulses received by the IPM from this half of the BRM exactly equals the number originally stored in the auxiliary counter and the stream of pulses from the auxiliary velocity BRM is gated off on line 66. Thus, the IPM is updated by the amount of range correction stored in the auxiliary counter, which maintains the predicted target trajectory. The pulses from the second half of the BRM to the IPM are delayed slightly to avoid coincidence with pulses from the other output. As a result, the IPM receives interlaced streams of pulses from the two outputs.

The system programming logic directs the function of the different parts of the intermittent tracker and controls the mode of operation of this device. There are actually four operating modes; designation, range acquisition, velocity acquisition, and track, which represent the different possible methods of signal handling. A short description of each mode is represented below.

Once the programming logic is switched to the Designation Mode, a gate prohibits any radar returns from entering the device. Instead, a separate designate line is gated on and the intermittent tracker awaits the arrival of a pulse, on this line, to designate the approximate range of the target. When a designate pulse is received, it is gated directly to the IPM 22 to set it to the corresponding range. After the IPM has been designated, the programming logic switches to the range acquisition mode.

In the Range Acquisition Mode, the designate line is gated off, and the radar returns are allowed to enter the device. The range error detector 12 operates in a normal manner, except that the range acceptance gate is not operative. Any pulse that occurs while the error counter 14 is active, i.e., within 512 range increments of the designated range, is accepted as the desired target. When such a pulse arrives, the IPM is updated immediately to the measured range and the programming logic switches to the velocity acquisition mode.

In the Velocity Acquisition Mode, the next received return from the target is used to determine the approximate target velocity and to update the target prediction to the measured range. This result is accomplished by using the rapid velocity acquisition logic 13. When the radar return is received, the range error detector 12 measures the distance traveled since the last radar return. This error is fed to the rapid velocity acquisition logic 13, which calculates the approximate velocity, $E/\Delta T_n$. This calculated velocity is then transferred through the range and velocity updating logic 16 to the velocity counter 17, while the measured error is similarly transferred to the auxiliary counter 18. This mode is also used when the received radar target returns become highly intermittent. Whenever the time between pulses exceeds $T_o/4$, then a pulse to the programming logic from the time counter 15 resets the intermittent tracker to the velocity acquisition mode. Under this condition, the calculated velocity, $E/\Delta T$, and measured range are added respectively to the velocity already stored in the velocity counter 17 and to the auxiliary counter 18. The result is a linear predicted target trajectory which is determined by the last two measured points. After a single radar return is observed and processed in the velocity acquisition mode, the intermittent tracker is switched to the tracking mode.

In the Tracking Mode, which is the normal operating mode under reasonably good signal detection conditions, the intermittent tracker predicts a target trajectory based, approximately, upon the samples of range data received in the last $T_o$ seconds. The range acceptance gate is reduced to its minimum width to allow the best possible tracking in noise. Any radar returns received during the range acceptance gate are used to measure the error in the target prediction and this error is transferred to the time increment logic. The time increment logic 13 calculates the equivalent error, $E' = E\Delta T$, and this quantity is then multiplied by the appropriate constants, $K_1'$ and $K_2'$ to update respectively the velocity and auxiliary counters 17 and 18. The quantities in these counters are used, naturally, to continually update the IPM in the appropriate manner. The intermittent tracker will remain in this mode as long as radar returns are received at intervals of less than $T_o/4$ seconds, or until the designate button is pushed to redesignate the tracker to a different target.

Obviously many modifications and variations of the present invention are possible in the light of the above teachings. It is therefore to be understood, that within the scope of the appended claims the invention may be practiced otherwise than as specifically described.

What is claimed is:

1. An intermittent data tracking system comprising:
   input means for producing a standard width pulse from any length target input pulse;
   error detecting means for measuring the distance between said target input pulse and a predicted target range;
   an error counter means connected to a first output of said error detecting means;
   a time counter means connected to a second output of said error detecting means;
   a first binary rate multiplier for performing range acquisition and time increment logic having three inputs, said first input connected to said error counter, said second input connected to said time counter and said third input connected to a third output of said error detecting means;
   range and velocity updating logic means connected to said first binary rate multiplier having a first output connected to a velocity counter and a second output connected to an auxiliary counter;
   a second binary rate multiplier connected between the outputs of said velocity and auxiliary counters, a first output of said second binary rate multiplier being connected to the input of said auxiliary counter;
   a digital storage and readout means connected to a second output of said second binary rate multiplier;
   means for supplying synchronizing signals to said digital storage means; and
   a target generating means connected to said storage and read-out means to produce a synthetic radar pulse representative of the target input signal.

2. The intermittent data tracking system of claim 1 wherein said input means comprises a video quantizer.

3. The intermittent data tracking system of claim 2, wherein:
   said time counter comprises a clock which measures the time between successive radar returns,
   said error counter comprises a forward-backward counter to store the range error measured by said error detector,
   said measured and stored information being transmitted to said first binary rate multiplier.

4. The intermittent data tracking system of claim 3, wherein said first binary rate multiplier comprises:
   a counting register having an input connected to said means for supplying synchronizing signals,
   a series of AND gates having first and second inputs, said first input of each of said AND gates being connected to a different stage and said counting register, said second input of each of said AND gates being connected to a different stage of said time counter means and,
   an OR gate which has an input connected to each output from said series of AND gates.

5. The intermittent data tracking system of claim 4 wherein
   said velocity counter means comprises first digital counter to store the current predicted estimate of target velocity;
   said auxiliary counter means comprises a second digital counter to store the difference in range between the predicted target range and the range stored in said digital storage and readout means; and
   wherein said information in said first and second counters is transmitted to said range and velocity updating logic means to gate said second binary rate multiplier.

6. The intermittent data tracking system of claim 3, wherein:
   said second binary rate multiplier comprises a counting register which has an input connected to said clock in said time counter,
   said counting register functioning as an integral part of said second binary multiplier which provides update information to said digital storage and readout means.

7. The intermittent data tracking system of claim 6 wherein said first digital counter is a forward-backward counter.

* * * * *